(12) United States Patent  
Stobbart

(10) Patent No.: US 8,944,472 B2  
(45) Date of Patent: Feb. 3, 2015

(54) CONDUIT JOINT AND SEAL RING

(75) Inventor: John Stobbart, Swansea (GB)

(73) Assignee: Vector International Limited, Port Talbot (GB)

( * ) Notice: Subject to any disclaimer, the term of this patent is extended or adjusted under 35 U.S.C. 154(b) by 457 days.

(21) Appl. No.: 13/155,781

(22) Filed: Jun. 8, 2011

(65) Prior Publication Data

US 2011/0304134 A1 Dec. 15, 2011

(30) Foreign Application Priority Data

Jun. 9, 2010 (GB) .................................. 1009619.6

(51) Int. Cl.
F16L 27/053 (2006.01)

(52) U.S. Cl.
CPC .................................. F16L 27/053 (2013.01)
USPC .......................... 285/270; 285/261; 285/271

(58) Field of Classification Search
USPC .................. 285/261, 263–264, 270–271, 267
See application file for complete search history.

(56) References Cited

U.S. PATENT DOCUMENTS

| 664,291 | A | * | 12/1900 | Reniff | 285/107 |
|---|---|---|---|---|---|
| 1,057,939 | A | * | 4/1913 | Cooper | 285/261 |
| 1,950,637 | A | * | 3/1934 | Taub | 180/292 |
| 2,465,373 | A | * | 3/1949 | Hall | 285/262 |
| 3,302,885 | A | * | 2/1967 | Herbert | 239/265.19 |
| 3,712,645 | A | * | 1/1973 | Herter | 285/95 |
| 3,754,779 | A | * | 8/1973 | Peress | 285/11 |
| 3,759,550 | A | * | 9/1973 | Peress | 285/11 |
| 3,961,815 | A | * | 6/1976 | Coulboy et al. | 285/93 |
| 4,133,557 | A | * | 1/1979 | Ahlstone | 285/39 |
| 4,153,278 | A | * | 5/1979 | Ahlstone | 285/18 |
| 4,153,281 | A | * | 5/1979 | Ahlstone | 285/146.3 |
| 4,381,871 | A | * | 5/1983 | Dopyera et al. | 285/261 |
| 4,842,059 | A | | 6/1989 | Tomek | |
| 5,368,342 | A | | 11/1994 | Latham et al. | |
| 6,454,313 | B1 | | 9/2002 | Dawson, Jr. et al. | |
| 2005/0012329 | A1 | | 1/2005 | Brown | |

FOREIGN PATENT DOCUMENTS

| GB | 1603199 | 11/1981 |
|---|---|---|
| GB | 2199101 A | 6/1988 |
| GB | 2218167 A | 11/1989 |

* cited by examiner

Primary Examiner — Aaron Dunwoody
Assistant Examiner — Fannie Kee
(74) Attorney, Agent, or Firm — Gordon & Jacobson, PC

(57) ABSTRACT

An all metal ball and socket joint for connecting two misaligned conduits in fluid-tight communication utilizes a metal seal ring having a substantially conical bore which provides a relatively flush bore profile to fluid flowing through the seal ring. The cone angle of the conical bore is chosen in accordance with the maximum misalignment expected. The seal ring is attached to the nose of the ball member preferably by bolts. Seals are pressure energized by fluid flow. An annular o-ring groove and a pressure port can be provided to allow a back seal test to be carried out during installation.

11 Claims, 2 Drawing Sheets

CONDUIT JOINT AND SEAL RING

CROSS-REFERENCE TO RELATED APPLICATIONS

The present application claims priority from GB1009619.6, filed on Jun. 9, 2010, herein incorporated by reference in its entirety.

BACKGROUND OF THE INVENTION

1. Field of the Invention

The present invention relates generally to an improved ball and socket conduit joints for connecting two misaligned conduits in fluid-tight communication, and to a metal seal ring for use therein.

2. State of the Art

It is common in the oil production and refining industries to utilize a ball and socket type joint to join two misaligned conduit ends. These prior art ball and socket conduit joints have found application in both above-sea environments and sub-sea environments.

U.S. Pat. No. 5,368,342 discloses such a seal ring and joint. This prior art invention is representative of the attempts made to provide a fluid-tight, ball and socket joint for coupling misaligned pipes. It does not, however, employ a seal ring that offers a relatively flush bore profile to fluid flowing through the seal ring.

SUMMARY OF THE INVENTION

In one aspect, the present invention consists of a ball and socket conduit joint comprising; a socket member having a substantially spherical inside surface including a first seal seat; ball member having a substantially spherical outside surface for engagement by the substantially spherical inside surface of the socket member and an annular portion including a second seal seat; a metal seal ring of tubular form having a substantially conical bore and having on an outwardly facing surface, a first sealing surface for sealing engagement with said first seal seat, a second sealing surface for sealing engagement with said second seal seat and between said first and second sealing surfaces an annular protrusion; a first arrangement for securing said annular protrusion to said ball member; and a second arrangement for holding said ball member in said socket member so that said first sealing surface is in fluid-tight engagement with said first seal seat and said second sealing surface is in fluid-tight engagement with said second seal seat.

In use fluid flow from one conduit end to the other passes through said conical bore which provides a relatively flush bore profile to fluid flowing through the seal ring. The cone angle of the conical bore can be chosen in accordance with the maximum misalignment expected.

In a second aspect, the present invention consists of a ball and socket conduit joint comprising; a socket member having a substantially spherical inside surface including a first seal seat; ball member having a substantially spherical outside surface for engagement by the substantially spherical inside surface of the socket member and a nose portion including a second seal seat; a metal seal ring of tubular form having a substantially uniformly tapered bore and having on an outwardly facing surface a first sealing surface for sealing engagement with said first seal seat, a second sealing surface for sealing engagement with said second seal seat and an annular protrusion located between the first and second sealing surfaces; a first arrangement for securing said annular protrusion to said nose portion; and a second arrangement for holding said ball member in said socket member so that said first sealing surface is in fluid-tight engagement with said first seal seat and said second sealing surface is in fluid-tight engagement with said second seal seat.

Preferably said first arrangement comprises a plurality of bolts which pass through apertures in said annular protrusion. This has the advantage that the seal ring can be secured to the ball member during manufacture.

In either the first or second aspects of the invention, the seals between said sealing surfaces and said seats are preferably energized by pressure exerted on the seal ring by fluid flow therethrough.

In a third aspect, the present invention consists of a metal seal ring of frusto-conical tubular form having a substantially conical bore and having on an outwardly facing surface, a first sealing surface for sealing engagement with a first seal seat, a second sealing surface for sealing engagement with a second seal seat and between said first and second sealing surfaces an annular protrusion for securing said seal ring to the ball member of a ball and socket joint.

BRIEF DESCRIPTION OF THE DRAWINGS

Other objects and advantages of the invention will become apparent upon reading the following detailed description and upon reference to the drawings.

DESCRIPTION OF THE PREFERRED EMBODIMENT

Figure 1:
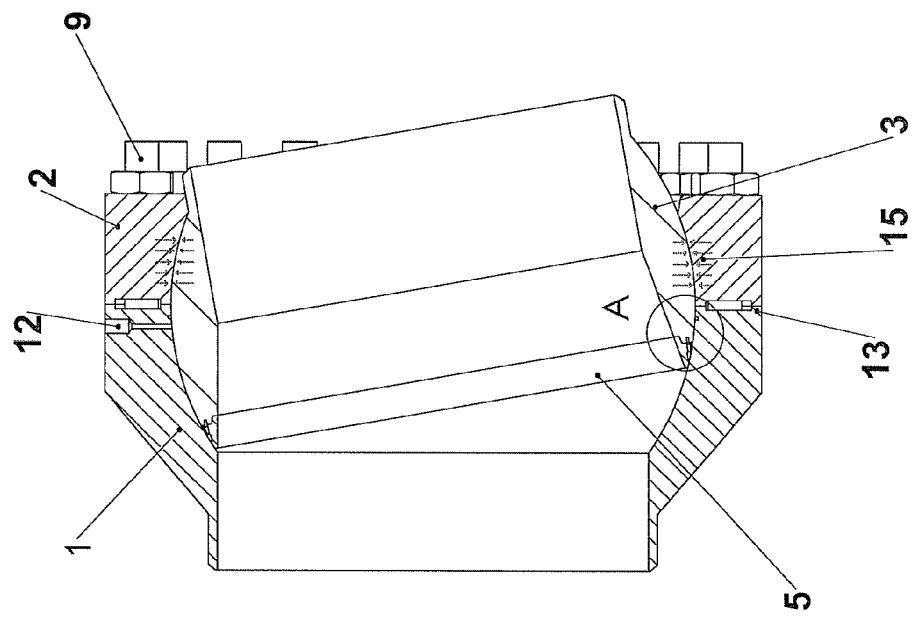
FIG. 1 shows a partial section of an assembled joint according to the present invention.

As shown in FIG. 1, socket member comprises a metal housing 1 and a metal retaining ring 2 which on installation are clamped together by metal studs and nuts 9. The socket member has a substantially spherical inside surface including a first seal seat on the inside of the housing 1. A metal ball member 3 has a substantially spherical outside surface for engagement by the substantially spherical inside surface of the socket member. The shape and dimensions of these parts are such that there is radial tension and compression therein at an interface 15 when the nuts 9 are tightened. In this manner the joint can be locked at the misalignment angle.

Figure 2:
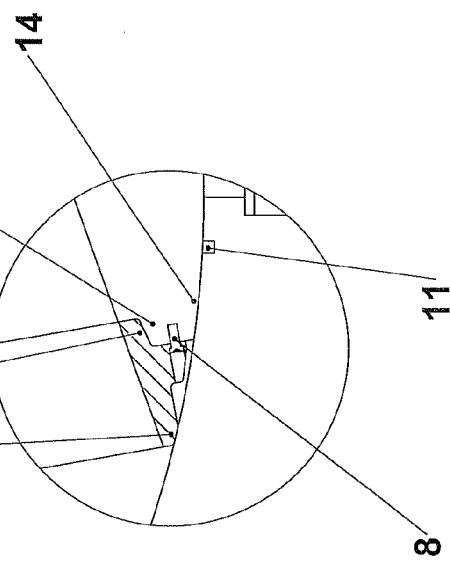
FIG. 2 is a close-up view of portion A in FIG. 1 showing the cross section of the seal ring in more detail.

As also shown in more detail in FIG. 2, the ball member has an annular nose portion 4 to which a metal seal ring 5 is secured by many (e.g. 28) bolts 8 sufficient to pre-energize the seal ring into the ball member 3.

Figure 3:
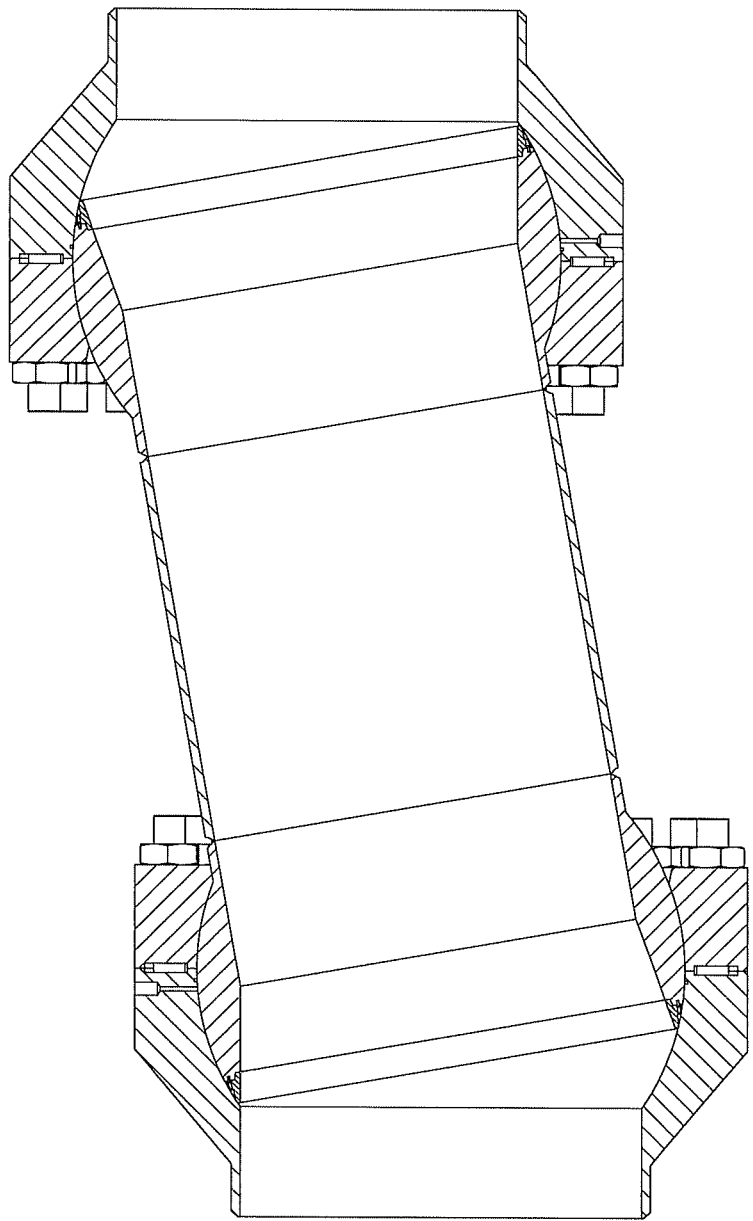
FIG. 3 is a sectioned view of two flanges with a conduit misalignment of 10°.

The nose portion 4 includes a second seal seat. The seal ring 5 is of frusto-conical tubular form and has a substantially uniformly tapered bore and has on an outwardly facing surface a first sealing surface 7 for sealing engagement with said first seal seat, a second sealing surface 6 for sealing engagement with said second seal seat and an annular protrusion which is located between the first and second sealing surfaces and extending outwardly towards but not reaching the first seal seat on the inside of the housing 1. The bolts 8 pass through apertures in said annular protrusion and secure said annular protrusion to said nose portion and are tightened during manufacture sufficiently to pre-energize the seal ring into the ball member 3. The cone angle determines the maximum degree of misalignment (shown in FIG. 3 as 10°) between conduits. The radius of the second sealing surface is slightly less than the radius of the first seal seat of the housing member 1 to reduce the contact area and thus increase the contact pressure and fluid pressure the seal can withstand. An auxiliary or secondary seal is provided at 14.

The studs and nuts 9 further function to hold said ball member in said socket member so that said first sealing surface is in fluid-tight engagement with said first seal seat and said second sealing surface is in fluid-tight engagement with said second seal seat. The seals between said sealing surfaces and said seats are pressure energized by pressure exerted on the seal ring by fluid flow therethrough.

An annular o-ring groove 11 and a pressure port 12 allow a backseal test to be carried out during installation. An annular groove 13 provides better metal to metal contact between the housing 1 and the retaining ring 2.

There have been described and illustrated herein several embodiments of a conduit joint and seal ring. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A ball and socket conduit joint comprising:
   a socket member having a substantially spherical inside surface including a first seal seat;
   a ball member having a substantially spherical outside surface for engagement by the substantially spherical inside surface of the socket member and an annular portion including a second seal seat, at least a portion of the ball member having a substantially conical bore;
   a metal seal ring of tubular form having an axial length, a substantially conical bore having a uniformly tapered inner surface extending throughout the axial length of the metal seal ring and an outwardly facing structure, wherein the inner surface extends from the conical bore of at least a portion of the ball member, and wherein the outwardly facing structure includes a first sealing surface for sealing engagement with said first seal seat, a second sealing surface for sealing engagement with said second seal seat and an annular protrusion which protrudes outwardly from both said first and second sealing surfaces and is between said first and second sealing surfaces;
   a first arrangement for securing said annular protrusion to said ball member; and
   a second arrangement for holding said ball member in said socket member so that said first sealing surface is in fluid-tight engagement with said first seal seat and said second sealing surface is in fluid-tight engagement with said second seal seat.

2. A ball and socket conduit joint according to claim 1, wherein:
   said first arrangement comprises a plurality of bolts which pass through apertures in said annular protrusion.

3. A ball and socket conduit joint according to claim 1, wherein:
   the seals between said sealing surfaces and said seats are energized by pressure exerted on the seal ring by fluid flow therethrough.

4. A ball and socket conduit joint according to claim 1, wherein:
   the annular protrusion extends radially outwardly towards but does not reach the second seal seat.

5. A ball and socket conduit joint comprising:
   a socket member having a substantially spherical inside surface including a first seal seat;
   a ball member having a substantially spherical outside surface for engagement by the substantially spherical inside surface of the socket member and a nose portion including a second seal seat, at least a portion of the ball member having a substantially conical bore;
   a metal seal ring of tubular form having an axial length, a uniformly tapered bore extending throughout the axial length of the metal seal ring and an outwardly facing structure, wherein the uniformly tapered bore of the metal seal ring extends from the conical bore of the ball member, and wherein the outwardly facing structure includes a first sealing surface for sealing engagement with said first seal seat, a second sealing surface for sealing engagement with said second seal seat and an annular protrusion which protrudes outwardly from both said first and second sealing surfaces and is between the first and second sealing surfaces;
   a first arrangement for securing said annular protrusion to said nose portion; and
   a second arrangement for holding said ball member in said socket member so that said first sealing surface is in fluid-tight engagement with said first seal seat and said second sealing surface is in fluid-tight engagement with said second seal seat.

6. A ball and socket conduit joint according to claim 5, wherein:
   said first arrangement comprises a plurality of bolts which pass through apertures in said annular protrusion.

7. A ball and socket conduit joint according to claim 5, wherein:
   the seals between said sealing surfaces and said seats are energized by pressure exerted on the seal ring by fluid flow therethrough.

8. A ball and socket conduit joint according to claim 5, wherein:
   the annular protrusion extends radially outwardly towards but does not reach the second seal seat.

9. A metal seal ring of tubular form for use with a ball and socket joint having a ball member that interfaces to a socket, the socket defining a first seal seat, and the ball member defining a second seal seat, the seal ring comprising:
   a uniformly tapered bore that extends throughout an axial length of the seal ring; and
   an outwardly facing structure having:
   i) a first sealing surface for sealing engagement with the first seal seat;
   ii) a second sealing surface for sealing engagement with the second seal seat; and
   iii) an annular protrusion which protrudes outwardly from both said first and second sealing surfaces and is disposed between said first and second sealing surfaces, for securing said seal ring to the ball member.

10. A metal seal ring according to claim 9, wherein:
    the first and second sealing surfaces face away from the bore.

11. A metal seal ring according to claim 9, wherein:
    the metal seal ring has a frusto-conical tubular form.

* * * * *